May 16, 1967 — YOSHIZO IKEGAMI — 3,320,359

TELEVISION SYSTEM

Filed April 30, 1964 — 2 Sheets-Sheet 1

INVENTOR

YOSHIZO IKEGAMI.

BY Otto John Munz.

ATTORNEY

May 16, 1967 YOSHIZO IKEGAMI 3,320,359
TELEVISION SYSTEM
Filed April 30, 1964 2 Sheets-Sheet 2
Fig. 4. A
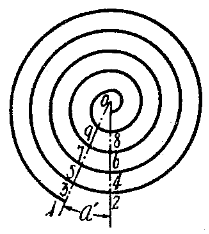
Fig. 5. A
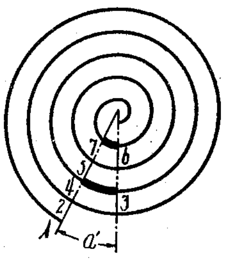
Fig. 4. B
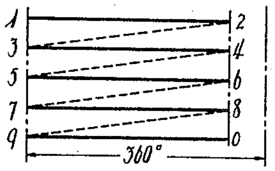
Fig. 5. B
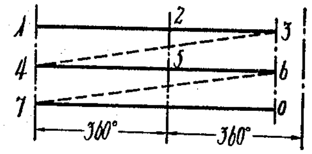
Fig. 4. C
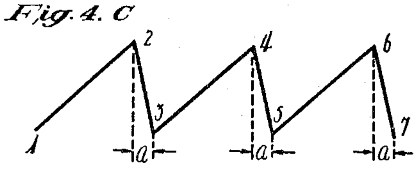
Fig. 5. C
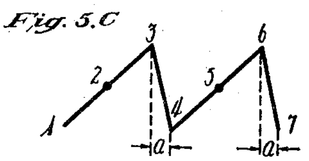
Fig. 6. A
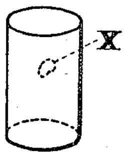
Fig. 6. B
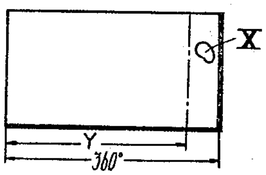
Fig. 7. A
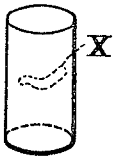
Fig. 7. B
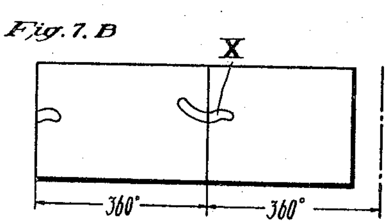
INVENTOR
YOSHIZO IKEGAMI.
BY Otto John Munz.
ATTORNEY United States Patent Office 3,320,359
Patented May 16, 1967

3,320,359
TELEVISION SYSTEM
Yoshizo Ikegami, Amagasaki, Japan, assignor to Konan Camera Laboratory Company Limited, Kobe, Japan, a corporation of Japan
Filed Apr. 30, 1964, Ser. No. 363,859
Claims priority, application Japan, Dec. 12, 1963, 38/67,099
2 Claims. (Cl. 178—6.8)

This invention relates to a television system, and more specifically to a spread picture reproducing system that affords reproducing of a spread picture on a raster surface of a picture tube by way of scanning rectangularly from video signals obtained by scanning a target of a pickup tube spirally.

Further, the invention relates to a spread picture reproducing system that affords reproducing of a spread picture consisting of one whole circumference and a part thereof on the raster surface of the picture tube by way of scanning rectangularly and in synchronizing with two or more periods of scanning line which is obtained by scanning the target of the pickup tube.

An object of this invention is to provide a television system that can be utilized to observe such places as the interior surface of a cylindrical body, the interior wall of a hole of an under ground boring, and the like, which are not observed directly by unaided eyes and the images of which form circular shapes.

Another object of the invention is to provide a television system that can reproduce a spread picture even though the angle of scanning is 360 degrees or more in the case of scanning the interior surface of the cylindrical body and the like.

The invention will be described in greater detail with reference to the accompanying drawings, in which:

FIGURE 3 is a diagram pertaining to the inventive system for illustrating the operation thereof, wherein (A) is a view showing a spherical mirror or a conical mirror in profile, (B) is a view showing a virtual image on the spherical mirror or the contical mirror, and (C) is a view showing a spread picture of the image illustrated in (B).

FIGURE 4 is a diagram pertaining to a prior art system wherein (A) is a view showing a pattern of spiral scan of a pickup tube, (B) is a view showing a pattern of rectangular scan of a picture tube, and (C) is a view showing a saw-tooth wave for making the rectangular scan in the picture tube.

FIGURE 5 is a diagram pertaining to the inventive system wherein (A) is a view showing a pattern of spiral scan of the pickup tube, (B) is a view showing a pattern of rectangular scan of the picture tube, and (C) is a view showing a saw-tooth wave for making the rectangular scan in the picture tube.

FIGURES 6 and 7 are diagrams pertaining to specific embodiments of the inventive system for illustrating the operation thereof, wherein (A) is a perspective view of a pipe and (B) is a view showing a spread picture of the interior surface of the pipe shown in (A).

Figure 1:
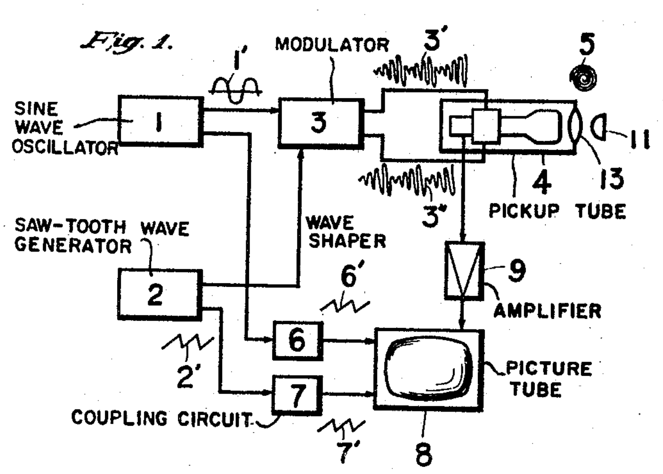
FIGURE 1 is a diagram of the inventive system showing a specific embodiment of the invention in block form.

In FIGURE 1, 1 is a sine wave oscillator having an oscillating frequency of N, 2 is a saw-tooth wave generator having a repetition frequency of $n$; and 3 is a modulator means for producing electric waves which are necessary for making spiral scanning by way of mixing said sine wave 1′ and saw-tooth wave 2′. This means makes the amplitude of said sine wave 1′, which has the frequency of N, vary linearly and derives two sine waves 3′, 3″ which have 90 degrees phase difference and each of which repeats said variation of the amplitude with the repetition period of $n$. By applying said sine waves 3′, 3″ on a deflecting means of the pickup tube 4, an electron beam makes spiral scanning 5 with scanning lines of $N/n=L$.

On the other hand, at the receiving side, the rectangular scanning with scanning lines of $N/n=L$ is conducted by way of conventional means. Referring to FIGURE 1, 6 is a wave shaper means for deriving a saw-tooth wave 6′, having a repetition frequency of N which is the same frequency as that of the sine wave 1′; and 7 is a coupling circuit means for deriving a saw-tooth wave 7′, having a repetition frequency of $n$ which is the same frequency as that of the saw-tooth wave 2′. These saw-tooth waves 6′, 7′, having the frequency of N and $n$, are then applied on respective deflecting means of the picture tube 8; and, by making each of these frequencies synchronize with the sine wave and the saw-tooth wave of said spiral scanning, both scannings will become identical in timing and the scanning lines of both are L. Further, in FIGURE 1, 9 is a means for amplifying video signals from the pickup tube 4.

Figure 2:
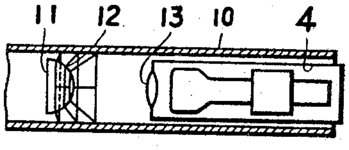
FIGURE 2 is a diagram of a pickup tube showing a specific embodiment of the invention.
Figure 2:
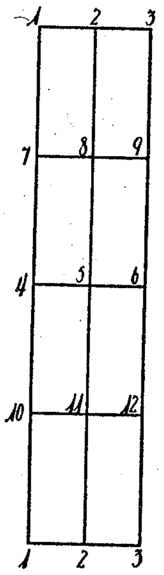
Figure 2:
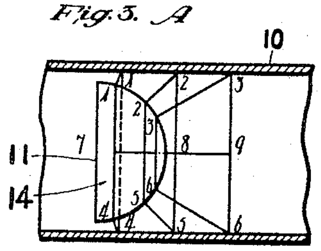
Figure 2:
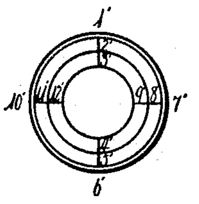

Operation of the system according to the present invention in case of observing a condition of the interior surface of a cylindrical pipe will be described by the following: Turning to FIGURE 2 of the drawings, there is shown a televising means. The small size pickup tube 4, such as a vidicon, is inserted into the interior of the cylindrical pipe 10; and in front of said pickup tube, a spherical mirror or a conical mirror 11 is placed. If there is such a pattern which thas a spread picture shown in FIGURE 3 (C) at a part 12 of the interior surface of the pipe 10, a virtual image of said pattern 14 will be formed on the spherical mirror or the conical mirror 11 as it is shown in FIGURE 3 (A). If this virtual image is viewed from the side of the camera, the image will be the one shown in FIGURE 3 (B), numerals at intersecting points of each line refer to the same intersections throughout the drawings (A), (B), and (C) in FIGURE 3. The virtual image shown in FIGURE 3 (B) focuses an image on the target surface of the pickup tube through a camera lens 13 keeping its shape unchanged. This image is then scanned spirally by the electron beam; however, since the pickup tube and the picture tube have the same scanning lines and are synchronized, one scanning line of the pickup tube, that is one spiral scanning line between a radius or one line of circular scanning lines, corresponds to one scanning line of the picture tube. Hence a picture on the raster surface of the picture tube will become the one shown in FIGURE 3 (B) and the picture will become approximately the same as the spread picture of the interior surface of the pipe.

In accordance with this invention, by receiving the image being formed on a surface of the spherical mirror or the conical mirror at the target surface of the pickup tube, and by supplying video signals derived from spiral scanning of said image on the target to the picture tube which makes rectangular scanning in synchronization with the spiral scanning and at the same scanning lines, the image can be displayed on the raster surface of the picture tube in the form of spread picture. Thus a spread picture is obtained corresponding to the actual image at the place which is not seen by unaided eyes directly, such as the interior surface of the cylindrical body, the interior wall of a hole of an underground boring and the like, which image is in a circular shape.

Further, in accordance with the invention, a spread picture continuing with no break of the image at retrace periods of scanning lines, which image in these periods will normally be erased, is displayed upon reproducing the spread picture. Referring to FIGURE 4, in the case where the number of scanning lines of the pickup tube is identical to that of the picture tube, or one period as shown by 1–2–3 in FIGURE 4 (A) is equal to one period as shown by 1–2–3 in FIGURE 4 (B), a scanning spot travels along the points 1, 2, 3; however, it spends a certain amount of time from the point 2 to the point 3. This time corresponds to the retrace period and is equal to the time identified by part *a* in the saw-tooth wave as shown in FIGURE 4 (C), which part is necessary to make rectangular scanning in the picture tube. Since the brightness of the scanning spot is erased during said part, no image will come out; in other words, the image within an angle of *a'* as shown in FIGURE 4 (A) is not displayed on the picture tube shown in FIGURE 4 (B) as a picture. This means, if there were such a speck as shown by X at the interior of a pipe as it is shown in FIGURE 6 (A) and this speck was just in the said break of the circumference, this pipe may be observed as if there were no speck, only a part Y of the spread image shown in FIGURE 6 (B) being displayed on the picture tube. In order to observe this speck, other means are required such as means to rotate the camera head; however, if the pipe is long, this may become difficult.

In accordance with this invention, by selecting the repetition frequency of the saw-tooth wave as shown in FIGURE 5 (C), for instance, as twice that of the repetition frequency shown in FIGURE 5 (A), the scanning spot travels along the points 1–2–3–4. This means that the travel of the spot along line 1–2 corresponds to one period of the spiral scan, and the travel along line 2–3–4 corresponds to a second period of the spiral scan. The line 3–4 in the second period stands for a retrace period, retrace periods being shown by thick lines 3–4, 6–7 in FIGURE 5 (A) and, in FIGURE 5 (B), as dot lines 3–4, 6–7.

By this arrangement the spread picture consisting of one whole circumference and a part thereof can be reproduced on the picture tube without any break; and hence even though there were such a speck X at the interior of a pipe as it is shown in FIGURE 7 (A), the spread picture of this speck can be reproduced on the picture tube as it is divided into two parts by the edges of the picture as in FIGURE 7 (B) and more than 360 degrees of the circumference can be observed at one time. Thus, the state of speck X can be observed perfectly without rotating the camera.

What is claimed is:

1. A television display system comprising a pickup tube and a picture tube, optical means for focusing an image upon the target surface of said pickup tube, spiral scanning means for causing said pickup tube to scan said target surface spirally to develop a video signal corresponding to said image, means coupling said video signal to said picture tube, and rectangular scanning means for scanning said picture tube rectangularly in synchronization with said spiral scanning means to reproduce said image as a spread picture, the scanning periods of said spiral scanning means and said rectangular scanning means being so related that each line of said rectangular scan corresponds to at least 360 degrees of said spiral scan, whereby at least 360 degrees of said image is displayed on said picture tube.

2. A television display system as recited in claim 1, wherein said scanning period of said rectangular scanning means is at least twice the scanning period of said spiral scanning means.

References Cited by the Examiner

UNITED STATES PATENTS 3,080,556 3/1963 Breithaupt ---------- 178—6.8

FOREIGN PATENTS 144,315 2/1962 Russia.

OTHER REFERENCES

Television Engineering Handbook: Fink, 1957, c. 2, pp. 49–50; c. 17, p. 45.

DAVID G. REDINBAUGH, *Primary Examiner.*

J. A. ORSINO, *Assistant Examiner.*